United States Patent [19]

Samson

[11] Patent Number: 4,919,175
[45] Date of Patent: Apr. 24, 1990

[54] TREE DELIMBING APPARATUS

[75] Inventor: G. Leo Samson, Kamloops, Canada

[73] Assignee: Harricana Metal, Inc., Quebec, Canada

[21] Appl. No.: 223,234

[22] Filed: Jul. 22, 1988

[30] Foreign Application Priority Data

Jul. 24, 1987 [CA] Canada .................................. 543001

[51] Int. Cl.$^5$ ........................ B27L 1/00; A01G 23/08
[52] U.S. Cl. ...................................... 144/2 Z; 144/343
[58] Field of Search ........................ 144/2 Z, 3 P, 343

[56] References Cited

U.S. PATENT DOCUMENTS

| | | | |
|---|---|---|---|
| 3,443,611 | 5/1969 | Gunnar-Jorgensen | 144/2 Z |
| 3,659,636 | 5/1972 | Erikksson et al. | 144/2 Z |
| 4,257,461 | 3/1981 | Wangeby et al. | 144/2 Z |
| 4,278,918 | 7/1981 | Sigouin | 144/2 Z |
| 4,413,661 | 11/1983 | Marchildon | 144/2 Z |
| 4,582,104 | 4/1986 | Siqouin | 144/2 Z |

Primary Examiner—W. Donald Bray
Attorney, Agent, or Firm—Chernoff, Vilhauer, McClung & Stenzel

[57] ABSTRACT

A tree delimbing apparatus has a boom with a delimbing head and a set of traction arms to drive the log through the delimbing head. The boom is utilized to grasp the log and allow the traction arms to grip it, following which the traction arms then drive the log through the delimbing head to remove the branches.

9 Claims, 7 Drawing Sheets

4,919,175

TREE DELIMBING APPARATUS

BACKGROUND OF THE INVENTION

The invention relates to apparatus for delimbing felled trees, and more particularly to boom delimbers.

In the modern, highly-automated logging operations, a specialized machine is often used to delimb trees which have been felled and stacked by another machine. For example, according to one existing tree harvesting operation, a feller-buncher will fell trees and stack them in a central landing. A delimbing apparatus then is used to strip the logs of branches so that they may be more readily transported and processed.

A standard existing delimbing machine is mounted on a tracked vehicle. It has a long boom which may be horizontally extended, and a delimbing head at the end of the boom. The head is equipped with delimbing knives. The entire boom is pivoted on the vehicle. To operate the delimber, the boom is extended and the delimbing head grasps the tree, using grapple jaws. The boom is then retracted to place the end of the tree in holding arms which are fixed with respect to the vehicle. The boom is then again extended along the length of the tree, with the delimbing knives acting to cut off branches as the boom is extended. Once the entire length of the tree has been delimbed by the extended boom, the tree is returned to the stack. Typically the delimbing head will also have a topping knife or saw to cut off the top end of the tree, and may also have a device for measuring the length of the tree which has been delimbed.

A problem with existing delimber designs is that the pivot point for the boom is generally on the front edge of the supporting vehicle. Because the boom extends a very long distance from the vehicle, to avoid the vehicle tipping over a large counterweight is required, or it is necessary to utilize a larger supporting vehicle. In some cases it is also necessary to extend the length of the caterpillar tracks to provide a broader base. Also, problems have been encountered in the measuring function of the boom in that rollers are used which spin on the surface of the log.

The present invention overcomes these problems by providing a delimber apparatus in which the log is conveyed through the delimbing knives, rather than extending the delimbing knives along the length of the log. Traction arms are provided which grip the log and drive it lengthwise through the delimber head. This design also facilitates the accurate measurement of the length of the log. Also, in the present invention, the pivot point is located back from the front edge of the carrying vehicle, and a pivotable base is provided which allows the delimbing apparatus to be lowered to a compact position for transport.

SUMMARY OF THE INVENTION

The present invention provides a delimbing apparatus adapted to be mounted on a supporting vehicle, comprising a frame, a boom mounted for extension and retraction in the frame and having a delimbing head at one end provided with gripping jaws and delimbing knives, and means for grasping the log to be delimbed to drive it through the delimbing head. In one embodiment, the driving means comprises two or three traction arms having drive belts or chains for contacting the log. In another embodiment, two pivoting knives on holding arms are used in conjunction with a drive belt or chain.

BRIEF DESCRIPTION OF THE DRAWINGS

In drawings which illustrate an embodiment of the invention.

DETAILED DESCRIPTION OF A PREFERRED EMBODIMENT OF THE INVENTION

Figure 1:
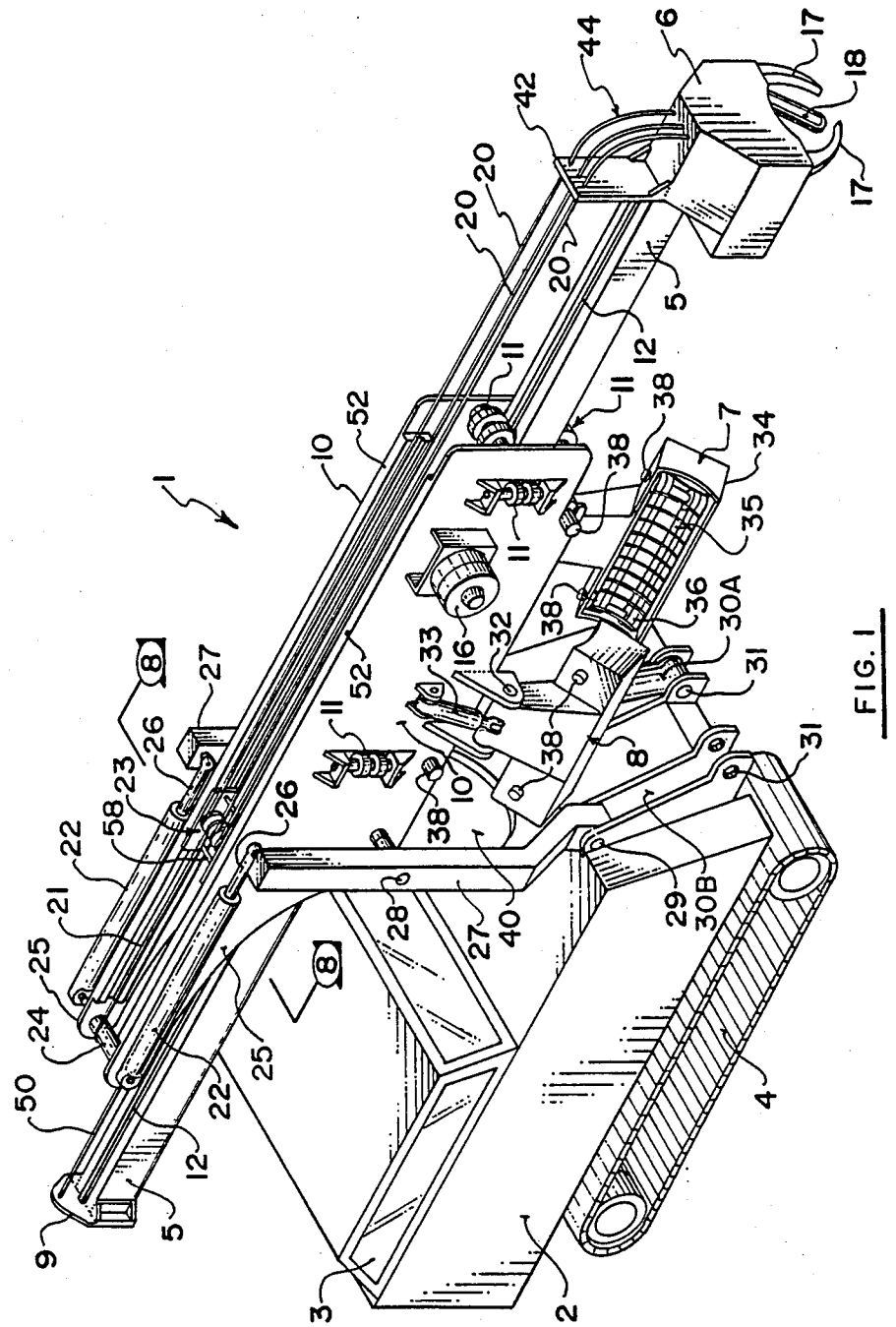
FIG. 1 is an isometric view of the delimbing apparatus of the invention installed on a tracked vehicle.

FIG. 1 shows a delimbing apparatus of the invention, denoted generally as 1, mounted on a carrier vehicle 2 having a cab 3 and pair of caterpillar tracks 4. The delimbing apparatus has a boom 5, a delimbing head 6 and traction arms 7 and 8.

Figure 7:
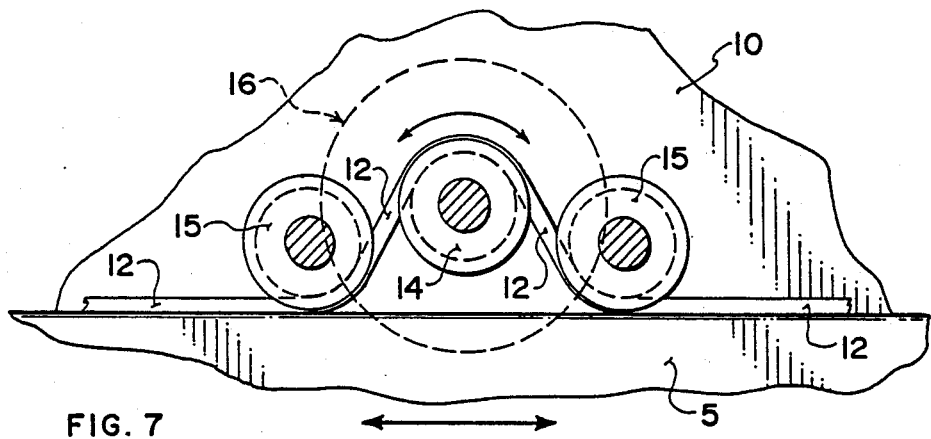
FIG. 7 is a cross-sectional view of the boom traction rollers of the invention.

Boom 5 consists of a steel girder having an end plate 9. Boom 5 is mounted for horizontal sliding movement within a frame 10. The boom 5 slides within frame 10 on rollers 11. The boom is power-operated for extension and retraction by means of a chain 12 which is attached to the boom at either end, and which is driven by a drive sprocket 14 shown in FIG. 7. Idle sprockets 15 maintain the chain in tight relationship with the drive sprocket. Drive sprocket 14 is in turn driven by hydraulic motor 16.

Figure 5:
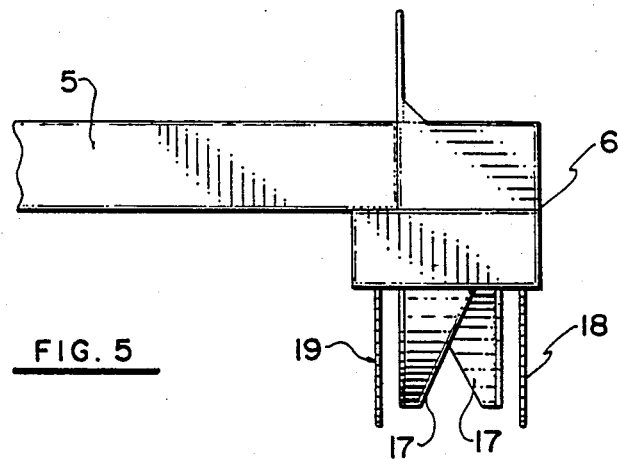
FIG. 5 is a side view of the novel delimber head of the invention.
Figure 6:
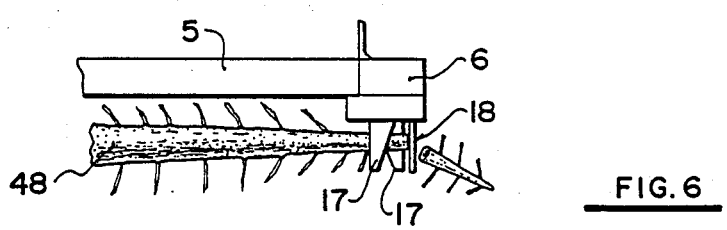
FIGS. 6 and 6A illustrate the operation of topping and butting saws of the delimber head shown in FIG. 5.
Figure 6A:
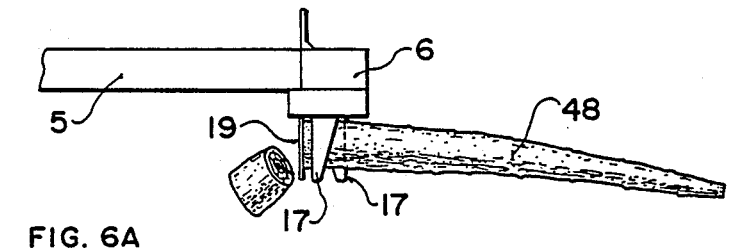
Figure 8:
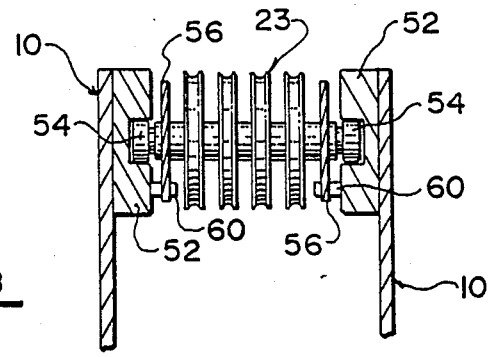
FIG. 8 is a cross-sectional view taken along lines 8—8 of FIG. 1.
Figure 8A:
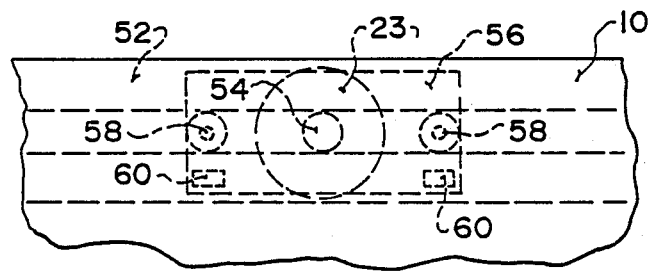
FIG. 8A is a side view of the carriage assembly shown in FIG. 8.
Figure 9:
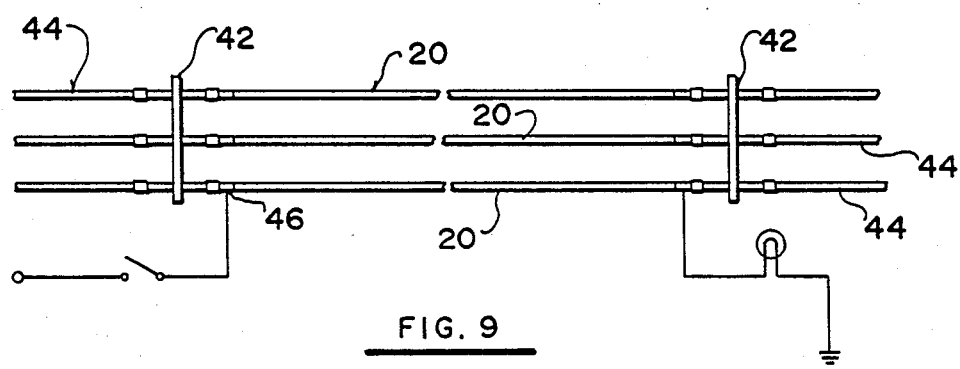
FIG. 9 is a simplified schematic drawing of a electric wiring arrangement of the boom of the invention.
Figure 9B:
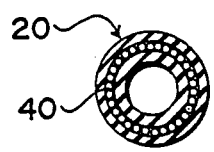
FIG. 9B is a cross-section of one of the hoses shown in FIG. 9.

Delimber head 6, shown in further detail in FIGS. 5 and 6, has two retractable grapple arms 17, a topping saw 18 and butt saw 19. The grapple arms are hydraulically operated, while the topping and butt saws are chainsaws which are driven by hydraulic motors. Connections for electrical and hydraulic power are made through cables 20. As shown in cross-section in FIG. 9B, preferably these cables 20 carry both hydraulic and electrical connection by incorporating a metal braid coaxial cable 40 around the hydraulic hose. Where the electrical connection is desired to be made, the metal braid from the hose is connected to an insulated support 42 to which other conductors can be connected, while the hydraulic hose continues on in its circuit at 44 without metal braid. In this way both electrical and hydraulic connections can be made using the same hose. As shown in FIG. 1, three such hoses are utilized to provide electricity and hydraulic power to the delimber head. Additional hydraulic hoses 21 are used to supply hydraulic fluid to lifting cylinders 22. The four hoses are fed out over pulleys 23 shown in FIG. 8.

Lifting cylinders 22 are pivotally connected at their base to axle 24 on extension 25 of frame 10. The piston rod 26 of cylinders 22 is pivotally connected to the inside surface of the upper end of supporting arms 27. Frame 10 is pivotally mounted between arms 27 on an axis on pivot point 28. Arms 27 are in turn pivotally mounted to the carrying vehicle at 29. A pneumatic cylinder 30A has its base pivotally mounted at 31 to the carrying vehicle and its piston rod pivotally mounted to support arm 27 in order to raise or lower the delimbing apparatus. A second cylinder (not shown) may be located at 30B.

Figure 2:
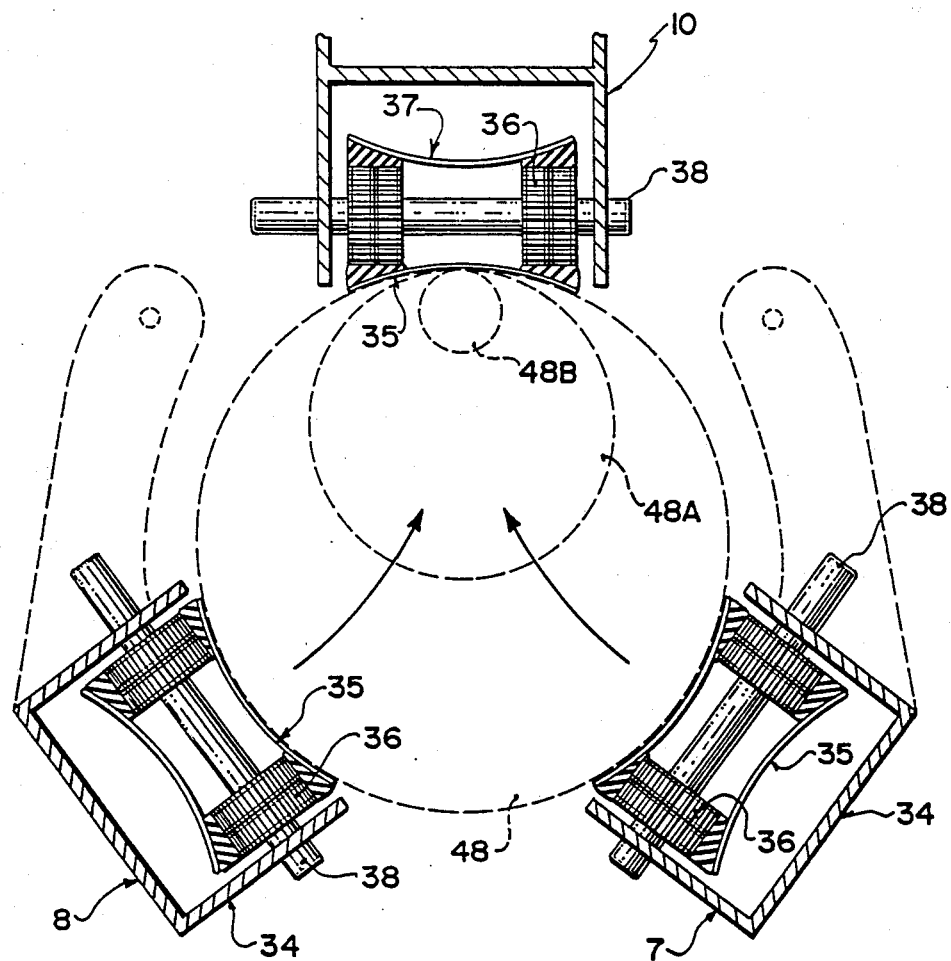
FIG. 2 is a front view of the traction arms of the invention.
Figure 11:
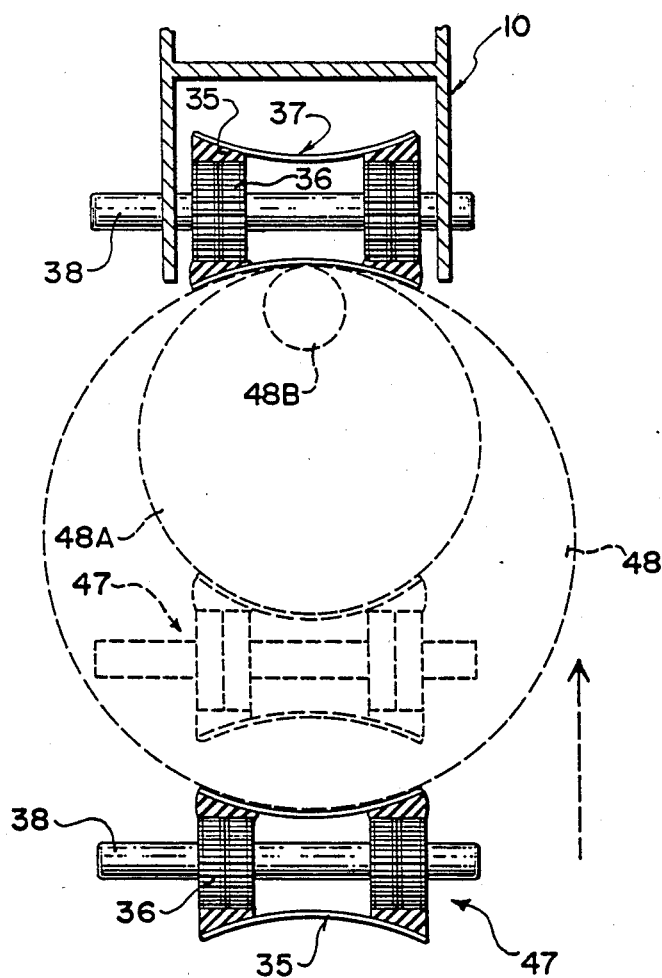
FIG. 11 illustrates a further alternative embodiment of the traction arms shown in FIG. 2.

Traction arms 7 and 8 are pivotally mounted about pins 32 and may be pivoted about such pins by means of hydraulic cylinder 33. The traction arms are shown also in FIG. 2. Each comprises a body portion 34 shaped to fit against the exterior of the log, a flexible drive belt 35 consisting of chains or rubber, drive pulleys 36 for driving the belt and a hydraulic motor (not shown) for powering the drive pulleys. As shown in FIG. 2, the two traction arms 7 and 8 are able to rotate upwardly to conform to different sized logs. The main traction drive 37 is shown in FIG. 2 and is hidden in FIG. 1. It is fixedly mounted on the underside of frame 10, but also includes a drive belt or chain 35 and drive pulley 36. The drive pulleys rotate on axles 38. A variation on this embodiment is shown in FIG. 11 where a single mobile traction arm 47 is used.

Figure 3:
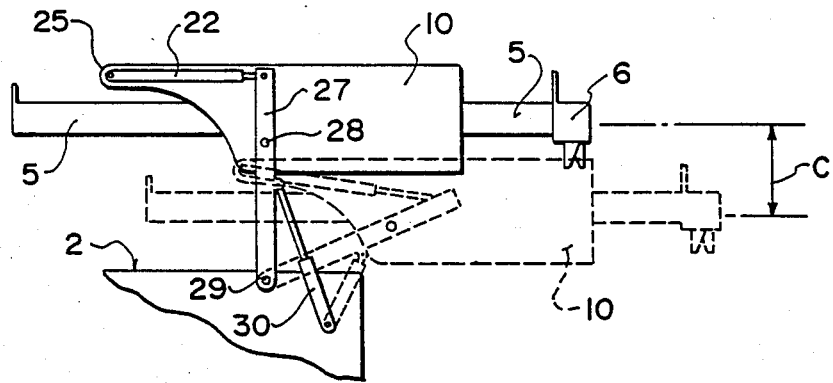
FIG. 3 is a simplified schematic view from the side of the pivoting base of the delimbing apparatus of the invention showing the transport position in phantom outline.
Figure 4:
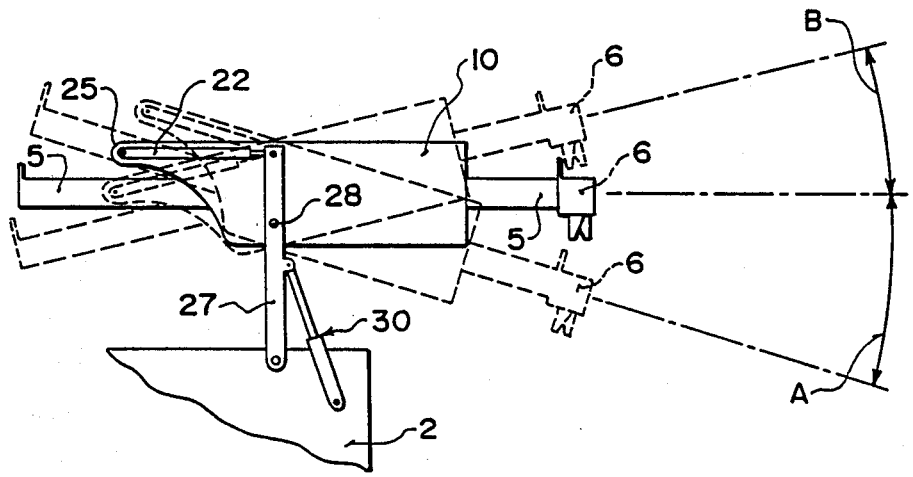
FIG. 4 is a side view of the base shown in FIG. 3 showing in phantom outline various working positions.

The manner in which the base of the delimber may be pivoted is shown in FIG. 4. By extending or retracting lifting cylinders 22, the delimber may be tilted from a maximum downward angle A to a maximum upward angle B during the working operation. By retracting positioning cylinders 30, the frame 10 can be lowered to a position adjacent to the carrying vehicle and the delimber may be readily transported in that position as shown in phantom outline in FIG. 3.

In operation, the delimber head is lowered to contact with the butt of the log 48 which is to be delimbed, and grappling arms 17 are tightened around the log. The boom 5 is then retracted to draw the log close to the delimbing apparatus. The log is then grasped at a point which will allow enough of the log to extend past the delimber head so that it may be inserted through opening 40 between upstanding arms 27 under frame 10. Once the log is sitting in saddle-shaped opening 40, traction arms 7 and 8 are driven upwardly against the circumference of the log, and the log may be driven rearwardly by drive belts or chain 35 on traction arms 7 and 8 and main traction unit 38. Grappling arms 17 which have knife edges, are then opened to a position just resting on the circumference of the log at one end, and the drive belts on traction arms 7, 8 and 37 are reversed in direction to drive the log through the delimber head 6 and past grappling arms 17. The arms may be gradually opened as the diameter of the log increases. In this way, the limbs on the log are stripped off. The butt of the tree may be sliced off by activating butt saw 19 which is swung through the log by a hydraulic motor. Also, prior to delimbing, the top of the tree may be sawn off by topping saw 18 in a similar fashion. The log is then returned to the stack.

Figure 10:
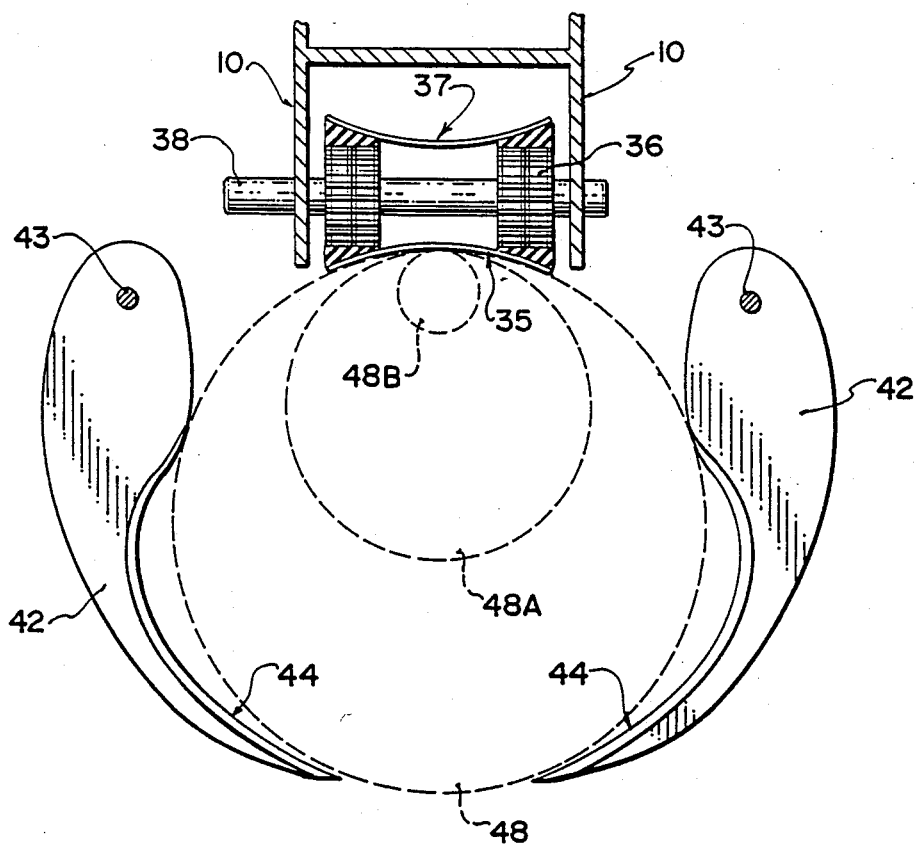
FIG. 10 illustrates an alternative embodiment of the traction arms shown in FIG. 2.

Rather than utilizing traction arms 7 and 8, knife edges 44 may be used in place of these traction arms to add a further delimbing stage. In this embodiment, only traction unit 37 drives the tree through the delimbing knives. The holding arms which replace traction arms 7 and 8, shown in FIG. 10, are also adjustable by means of hydraulic cylinders, to pivot about axes 43.

It will be apparent to those skilled in the art that various adaptations and modifications of the structure above described are possible without departing from the scope of the invention, the extent of which is defined in the appended claims.

The embodiments of the invention in which an exclusive property or privilege is claimed are defined as follows:

1. A delimbing apparatus adapted to be mounted on a supporting vehicle, comprising:
   (a) a frame;
   (b) a boom mounted for extension and retraction in said frame and having at one end a delimbing head including gripping jaws and delimbing knives; and
   (c) driving means for grasping a log and driving said log through said delimbing head, said driving means including a first drive belt mounted on the underside of said frame, and second and third drive belts pivotally mounted below and to either side of said frame.

2. A delimbing apparatus adapted to be mounted on a supporting vehicle, comprising:
   (a) a frame;
   (b) a boom mounted for extension and retraction in said frame and having at one end a delimbing head having a first and second end, said delimbing head comprising gripping jaws, delimbing knives, a topping saw, and a butt saw, said topping saw and said butt saw being mounted for cutting in a direction perpendicular to a line drawn between said first and second ends of said delimbing head, with said topping saw positioned closest to said first end and said butt saw positioned closest to said second end; and
   (c) means for grasping a log and driving said log through said delimbing head in a direction from said second end towards said first end.

3. A delimbing apparatus adapted to be mounted on a supporting vehicle having a central longitudinal axis and front and rear ends, comprising:
   (a) a frame;
   (b) a boom mounted for extension and retraction in said frame and having at one end a delimbing head including gripping jaws and delimbing knives;
   (c) means for grasping a log and driving said log through said delimbing head; and
   (d) first and second support arms for supporting said frame, each said support arm being pivotally mounted at the lower end thereof to said supporting vehicle and said frame being mounted for pivotal movement between said support arms, said support arms, frame and supporting vehicle thereby forming a passageway sufficiently large to accommodate the diameter of said log.

4. The delimbing apparatus of claim 3 further including first pivoting means for pivoting said frame with respect to said support arms and second pivoting means for pivoting said support arms with respect to said vehicle, said first pivoting means having a first end pivotally secured to said frame and a second end pivotally secured to an upper end of one of said support arms, and said second pivoting means having a first end pivotally secured to said vehicle and a second end pivotally secured to one of said support arms.

5. The delimbing apparatus of claim 4 wherein said first and second pivoting means comprise hydraulic cylinders.

6. The delimbing apparatus of claim 4 wherein said lower ends of said support arms are pivotally connected to said vehicle at points adjacent to the central longitudinal axis of said vehicle.

7. The delimbing apparatus of claim 6 wherein said lower ends of said support arms are pivotally connected to said vehicle at points adjacent to the front end of said vehicle.

8. A delimbing apparatus adapted to be mounted on a supporting vehicle, comprising:
 (a) a frame;
 (b) a boom mounted for extension and retraction in said frame and having at one end a delimbing head including gripping jaws and delimbing knives; and
 (c) means for grasping a log and driving said log through said delimbing head, said means for driving said log through said delimbing head including a first drive belt mounted on the underside of said frame, and two opposed holding arms having delimbing knife edges and mounted for a pivotal motion on either side of said frame.

9. A delimbing apparatus adapted to be mounted on a supporting vehicle, comprising:
 (a) a frame;
 (b) a boom mounted for extension and retraction in said frame and having at one end a delimbing head including gripping jaws and delimbing knives; and
 (c) driving means for grasping a log and driving said log through said delimbing head, said driving means including a first drive belt mounted on the underside of said frame, and a second drive belt mounted for vertical movement below said frame.

* * * * *